April 1, 1947.                A. A. SHERER                2,418,197
                            GARMENT PROTECTOR
                           Filed Jan. 8, 1943

Inventor
Archie A. Sherer
By Henry G. Dybvig
His Attorney

Patented Apr. 1, 1947

2,418,197

UNITED STATES PATENT OFFICE 2,418,197

GARMENT PROTECTOR

Archie A. Sherer, Dayton, Ohio

Application January 8, 1943, Serial No. 471,775

2 Claims. (Cl. 2—46)

This invention relates to a protective shield for protecting the garments of a person sitting at a steering wheel of a vehicle.

An object of this invention is to provide a shield disposed intermediate the steering wheel of a vehicle and the clothing of the person sitting at the steering wheel.

Another object of this invention is to provide a protective shield extending across the abdomen of the wearer, so as to protect the outer garments from wear from a steering wheel.

Another object of this invention is to provide a protective shield extending across the abdomen, which protective shield is resiliently held in position, so as to protect the outer garments of the wearer.

Other objects and advantages reside in the construction of parts, the combination thereof and the mode of operation, as will become more apparent from the following description.

In the drawings,

Figure 1 discloses a perspective view of the protective shield as it appears when removed.

In my copending application Serial No. 399,817, now matured into Patent No. 2,321,528, granted June 8, 1943, I disclose a protective shield mounted between the driver and the steering wheel, which protective shield is attached to the motor vehicle. In the embodiment disclosed herein, another type of protective shield has been shown, wherein the protective shield is slipped into position on the body outside of the garments of the wearer, independently of the motor vehicle. This shield may be worn by the driver whether he drives his own motor vehicle or he drives some other motor vehicle. No attachment to the vehicle is required, as will appear more fully from the detailed description that follows.

Figure 1:
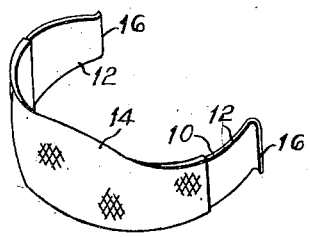
Figure 2:
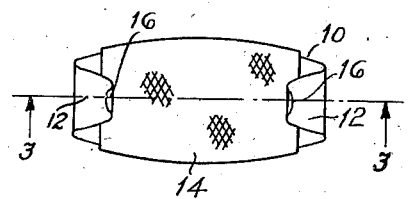
Figure 2 is a rear elevational view of the protective shield removed.
Figure 3:
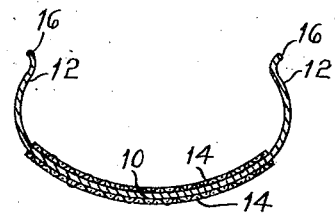
Figure 3 is a cross sectional view of the protective shield taken substantially on the line 3—3 of Figure 2.
Figure 4:
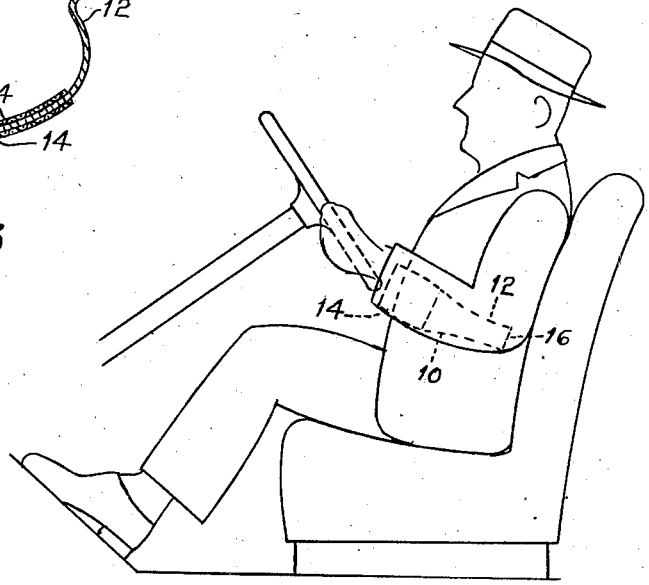
Figure 4 is a side elevational view showing the shield in use.

Referring to the drawings, the reference character 10 indicates a resilient member, the core of which may be made from steel, brass or any other suitable resilient material. The main body portion extends across the abdomen of the wearer, so as to be disposed between the garments and the steering wheel, as shown in Figure 4. The sides 12 extend rearwardly on the side of the wearer and are slightly reentrant, so as to snugly fit the side of the body of the wearer. The resiliency of the member holds it in position on the body. When the wearer of the shield leaves the motor vehicle, he may remove the shield by merely moving the sides 12 upwardly, so as to clear the body. When the shield is again positioned, it protects the outer garments from rubbing against the steering wheel and thereby prevents wear.

This shield may be used in automobiles, in trucks and buses or other land vehicles. It may be used by pilots of airplanes or others sitting at the steering wheel. It may be used in connection with launches, boats and any other type of vehicle utilizing a steering wheel or its equivalent.

The outer surface of the shield may be decorated or ornamented to suit the particular requirements. In the device disclosed, the protective shield has been shown as covered with a fabric 14. By this arrangement, the article has the appearance simulating wearing apparel. The resilient portion may preferably consist of a sheet of resilient material, although it is not so limited. The resilient portion may consist of arcuate ribs, spring wire or any other suitable construction.

In the particular embodiment disclosed herein, the fabric extends across the main body portion 10; but does not cover the side portions 12. For some purposes, the side portions could be covered as well as the main body portion. The rear edges 16 of the side portions 12 have been deflected and curved, so as to present an arcuate, smooth edge coming in contact with the driver's clothing. The edges could be beaded throughout, to thereby protect the clothing. This is a matter of choice, depending upon the use to which the shield is to be put, the type of clothing worn by the driver and the personal desires thereof. Instead of actually covering the shield with fabric, the shield could be embossed or otherwise ornamented, so as to present a neat, attractive appearance. For some purposes the shield could be provided with ornamentation harmonizing with the finish of the motor vehicle.

If the edge of the shield is provided with a bead, one side of the shield could be covered with fabric and the other side ornamented. The edge of the fabric could be clamped by the beaded portion.

The shield need not necessarily comprise a resilient member. It could consist of a pad, such as folded canvas, secured in position in any suitable manner, as for example, by a button hole adapted to be slipped over a coat button, or the like, or the shield could consist of a belt three or four inches wide, strapped around the body, with the portion in front being located between the body and the adjacent portion of the rim of the steering wheel. The belt could be made from leather, folded canvas, suitable webbing material or any other suitable fabric or flexible material.

The means for attaching the shield may be adjustable, so as to accommodate various sizes. If resilient means is used to hold the shield in position, it may be adjusted to various sizes to meet changed conditions. If a belt or any other fastening or securing means is used, this may also be adjustable.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A protective shield for protecting the outer garments of a person from wear by a steering wheel, said protective shield including a metallic main body portion having substantially the same width as the shield, said main body portion extending across the abdomen of the person at the proper height so as to be disposed between the outer garment of the person and the steering wheel, said metallic main body portion being substantially wider at the center and tapering towards the ends, which ends resiliently engage the sides of the person so as to hold the shield in position while in use.

2. A protective shield for protecting the outer garments of a person from wear by a steering wheel, said protective shield including a metallic main body portion having substantially the same width as the shield, said main body portion extending across the abdomen of the person at the proper height so as to be disposed between the outer garment of the person and the steering wheel, said metallic main body portion being substantially wider at the center and tapering towards the ends, which ends resiliently engage the sides of the person so as to hold the shield in position while in use, said shield being covered at least in part with a fabric so that the shield has an appearance simulating wearing apparel.

ARCHIE A. SHERER.

REFERENCES CITED

The following references are of record in the file of this patent:

UNITED STATES PATENTS

| Number | Name | Date |
|---|---|---|
| 954,132 | Prendergast | Apr. 5, 1910 |
| 796,695 | Blake | Aug. 8, 1905 |
| 1,524,457 | Selander | Jan. 27, 1925 |
| 1,205,749 | Kellogg | Nov. 21, 1916 |
| 2,048,087 | Wagenseil | July 21, 1936 |

FOREIGN PATENTS

| Number | Country | Date |
|---|---|---|
| 50,862 | Norwegian | May 18, 1932 |
| 89,510 | Swedish | June 22, 1937 |